US007698935B2

(12) United States Patent
Dibble et al.

(10) Patent No.: US 7,698,935 B2
(45) Date of Patent: Apr. 20, 2010

(54) DIAGNOSTIC SYSTEM FOR VALVE ACTUATION MECHANISM

(75) Inventors: Donovan L. Dibble, Utica, MI (US); Kenneth J. Cinpinski, Ray, MI (US); Matthew A. Wiles, Royal Oak, MI (US); Vimesh M. Patel, Novi, MI (US)

(73) Assignee: GM Global Technology Operations, Inc.

( * ) Notice: Subject to any disclaimer, the term of this patent is extended or adjusted under 35 U.S.C. 154(b) by 187 days.

(21) Appl. No.: 11/943,884

(22) Filed: Nov. 21, 2007

(65) Prior Publication Data

US 2009/0132146 A1 May 21, 2009

(51) Int. Cl.
*G01M 15/09* (2006.01)

(52) U.S. Cl. .................................................. 73/114.79

(58) Field of Classification Search .............. 73/114.77, 73/114.79, 115.01
See application file for complete search history.

(56) References Cited

U.S. PATENT DOCUMENTS

| | | | | |
|---|---|---|---|---|
| 6,691,653 | B2 * | 2/2004 | Denz | 123/90.15 |
| 7,246,583 | B2 * | 7/2007 | Cinpinski et al. | 123/90.27 |
| 2005/0204805 | A1 * | 9/2005 | Wakahara et al. | 73/118.1 |
| 2007/0068474 | A1 * | 3/2007 | Cinpinski et al. | 123/90.17 |
| 2008/0077307 | A1 * | 3/2008 | Wiles | 701/111 |
| 2009/0048729 | A1 * | 2/2009 | Waters et al. | 701/29 |

* cited by examiner

*Primary Examiner*—Eric S McCall

(57) ABSTRACT

A diagnostic system for an engine includes a pressure monitoring module that determines a plurality of first average pressure values and a plurality of second average pressure values of a fluid supply provided to a camshaft phaser. A diagnostic module identifies one of a plurality of cylinders associated with a failed variable valve lift mechanism based on the first and the second average pressure values. Each of the first and the second average pressure values respectively correspond to each of the plurality of cylinders.

20 Claims, 4 Drawing Sheets

DIAGNOSTIC SYSTEM FOR VALVE ACTUATION MECHANISM

FIELD OF THE INVENTION

The present disclosure relates to variable valve actuation systems, and more particularly to diagnostic systems for variable valve actuation systems.

BACKGROUND OF THE INVENTION

The statements in this section merely provide background information related to the present disclosure and may not constitute prior art.

Vehicles include an internal combustion engine that generates drive torque. More specifically, an intake valve is selectively opened to draw air into the cylinders of the engine. The air is mixed with fuel to form a combustion mixture. The combustion mixture is compressed within the cylinders and is combusted to drive pistons within the cylinders. An exhaust valve selectively opens to allow the exhaust gas to exit from the cylinders after combustion.

A rotating cam shaft regulates the opening and closing of the intake and exhaust valves. The camshaft includes a plurality of cam lobes that rotate with the camshaft. The profile of the cam lobe determines the valve lift schedule. More specifically, the valve lift schedule includes the amount of time the valve is open (duration) and the magnitude or degree to which the valve opens (lift).

Variable valve actuation (VVA) technology improves fuel economy, engine efficiency, and/or performance by modifying a valve lift event, timing, and duration as a function of engine operating conditions. Two-step VVA systems include variable valve assemblies such as hydraulically controlled switchable roller finger followers (SRFFs). SRFFs enable two discrete valve states (e.g. a low lift state or a high lift state) on the intake and/or exhaust valves.

Referring to FIG. 1, a hydraulic lift mechanism (i.e. a SRFF mechanism) 10 is shown in more detail. Those skilled in the art can appreciate that the SRFF mechanism 10 is merely exemplary in nature. The SRFF mechanism 10 is pivotally mounted on a hydraulic lash adjuster 12 and contacts the valve stem 14 of an inlet valve 16 that selectively opens and closes an inlet passage 18 to a cylinder 20. The engine inlet valve 16 is selectively lifted and lowered in response to rotation of an inlet camshaft 22 on which multiple cam lobes (e.g. low lift cam lobe 24 and high lift cam lobe 26) are mounted. The inlet camshaft 22 rotates about an inlet camshaft axis 28. Although the exemplary embodiment describes the SRFF mechanism 10 operating on the engine inlet valve 16, those skilled in the art can appreciate that a SRFF mechanism may operate similarly on an exhaust valve 30.

A control module transitions a SRFF mechanism from a low lift state to a high lift state and vice versa based on demanded engine speed and load. For example, an internal combustion engine operating at an elevated engine speed such as 4,000 revolutions per minute (RPMs) typically requires the SRFF mechanism to operate in a high lift state to avoid potential hardware damage to the internal combustion engine.

SUMMARY

A diagnostic system for an engine includes a pressure monitoring module that determines a plurality of first average pressure values and a plurality of second average pressure values of a fluid supply provided to a camshaft phaser. A diagnostic module identifies one of a plurality of cylinders associated with a failed variable valve lift mechanism based on the first and said second average pressure values. Each of the first and the second average pressure values respectively correspond to each of the plurality of cylinders.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
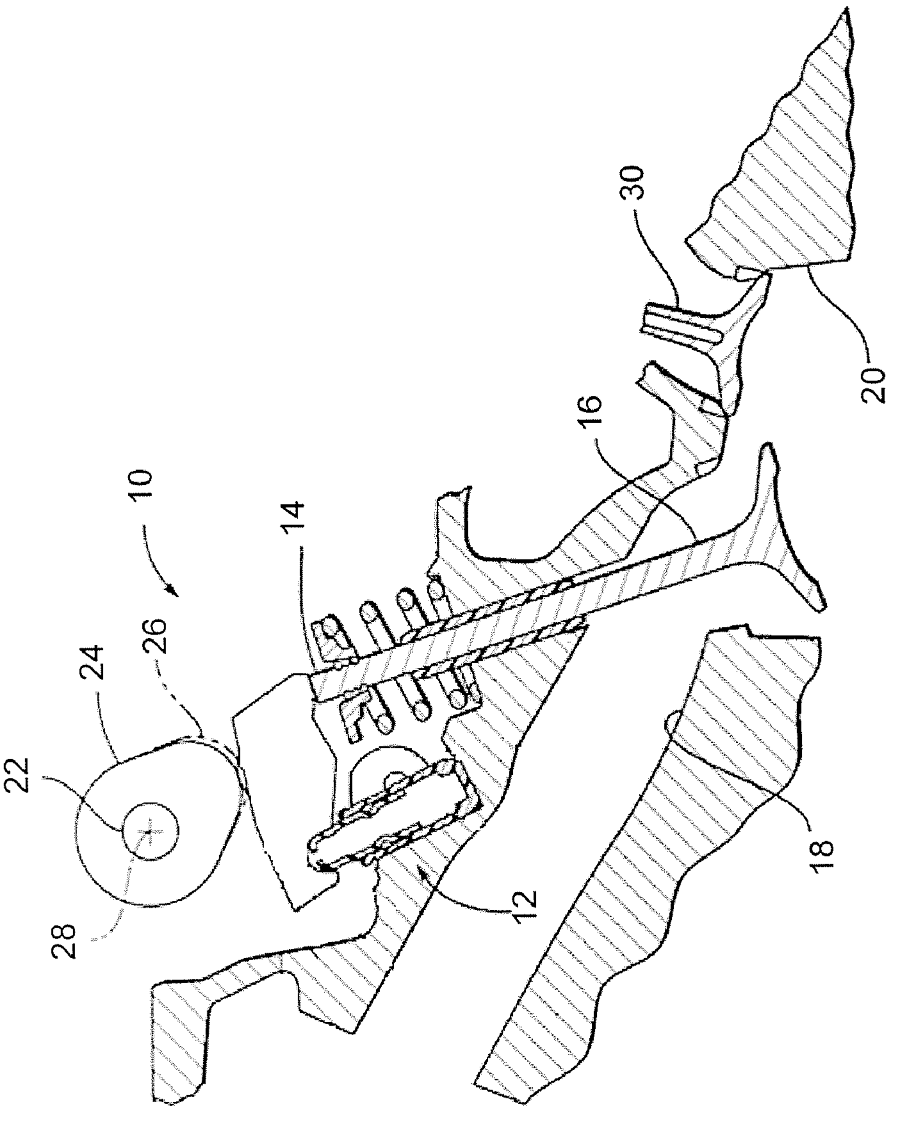
FIG. 1 Prior Art
FIG. 1 is a cross sectional view of an exemplary hydraulic lift mechanism according to the prior art.

The following description of the preferred embodiment is merely exemplary in nature and is in no way intended to limit the invention, its application, or uses. For purposes of clarity, the same reference numbers will be used in the drawings to identify similar elements. As used herein, activated refers to operation using all of the engine cylinders. Deactivated refers to operation using less than all of the cylinders of the engine (one or more cylinders not active). As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Figure 2:
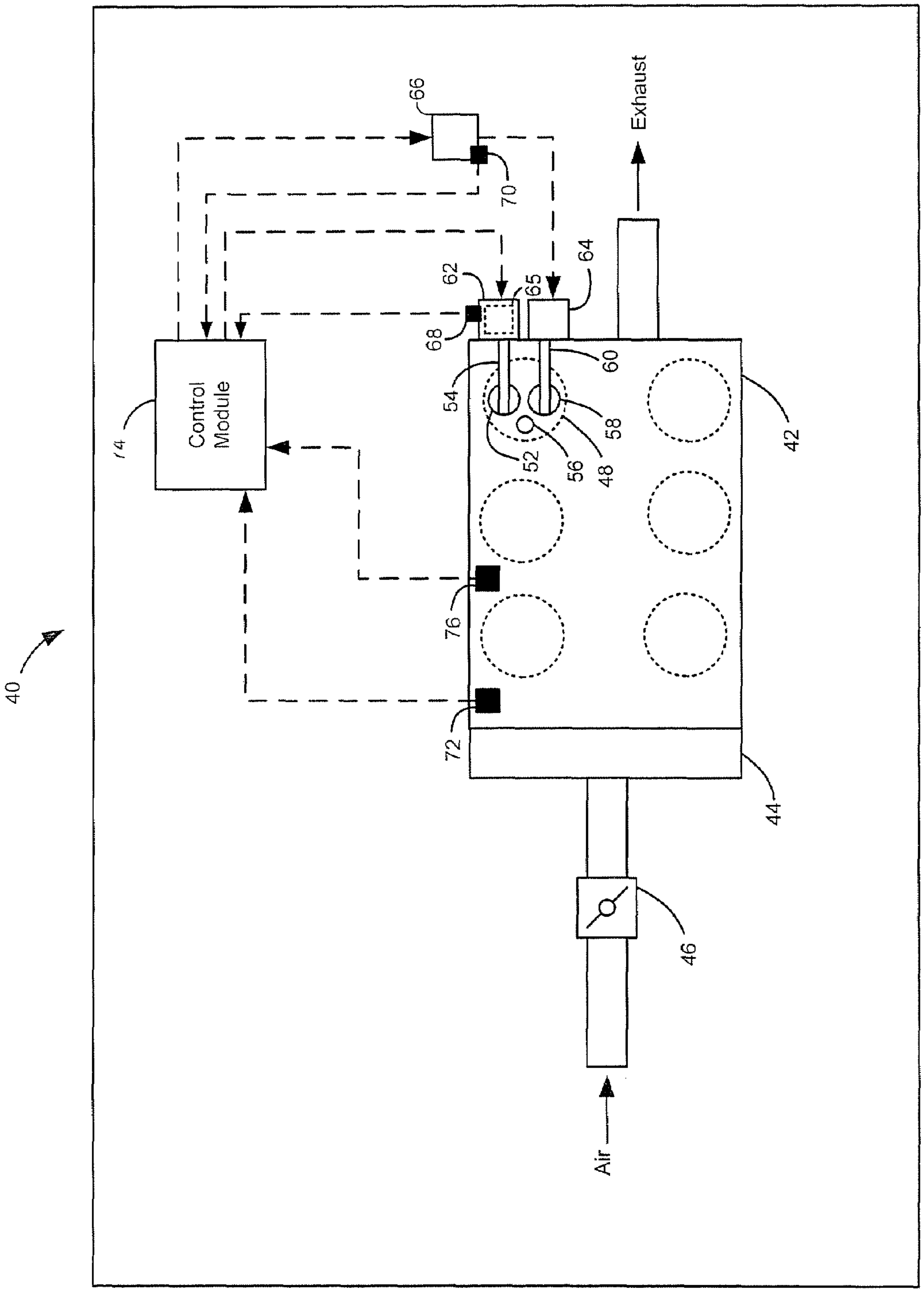
FIG. 2 is a functional block diagram of an exemplary vehicle including a diagnostic system according to the present disclosure.

Referring now to FIG. 2, an engine system 40 includes an engine 42 that combusts an air and fuel mixture to produce drive torque. Air is drawn into an intake manifold 44 through a throttle 46. The throttle 46 regulates mass air flow into the intake manifold 44. Air within the intake manifold 44 is distributed into cylinders 48. Although six cylinders 48 are illustrated, it is appreciated that the diagnostic system of the present invention can be implemented in engines having a plurality of cylinders including, but not limited to, 2, 3, 4, 5, 8, 10, and 12 cylinders.

A fuel injector (not shown) injects fuel that is combined with the air as it is drawn into the cylinder 48 through an intake port. The fuel injector may be an injector associated with an electronic or mechanical fuel injection system, a jet or port of a carburetor or another system for mixing fuel with intake air. The fuel injector is controlled to provide a desired air-to-fuel (A/F) ratio within each cylinder 48.

An intake valve 52 selectively opens and closes to enable the air/fuel mixture to enter the cylinder 48. The intake valve position is regulated by an intake camshaft 54. A piston (not shown) compresses the air/fuel mixture within the cylinder 48. A spark plug 56 initiates combustion of the air/fuel mixture, driving the piston in the cylinder 48. The piston drives a crankshaft (not shown) to produce drive torque. Combustion exhaust within the cylinder 48 is forced out an exhaust port when an exhaust valve 58 is in an open position. The exhaust valve position is regulated by an exhaust camshaft 60. The exhaust is treated in an exhaust system. Although single intake and exhaust valves 52 and 58 are illustrated, it can be appreciated that the engine 42 can include multiple intake and exhaust valves 52 and 58 per cylinder 48.

The engine system 40 may include an intake cam phaser 62 and an exhaust cam phaser 64 that respectively regulate the rotational timing of the intake and exhaust camshafts 54 and 60. More specifically, the timing or phase angle of the respective intake and exhaust camshafts 54 and 60 can be retarded or advanced with respect to each other or with respect to a location of the piston within the cylinder 48 or with respect to crankshaft position.

In this manner, the position of the intake and exhaust valves 52 and 58 can be regulated with respect to each other or with respect to a location of the piston within the cylinder 48. By regulating the position of the intake valve 52 and the exhaust valve 58, the quantity of air/fuel mixture ingested into the cylinder 48, and therefore the engine torque, is regulated.

The cam phaser 62 can include a phaser actuator 65 that is either electrically or hydraulically actuated. Hydraulically actuated phaser actuators 65, for example, include an electrically-controlled fluid control valve (OCV) 66 that controls a fluid supply flowing into or out of the phaser actuator 65.

Additionally, low lift cam lobes (not shown) and high lift cam lobes (not shown) are mounted to each of the intake and exhaust camshafts 54, 60. The low lift cam lobes and high lift cam lobes rotate with the intake and exhaust camshafts 54 and 60 and are in operative contact with a hydraulic lift mechanism such as a switching roller finger follower (SRFF) mechanism as depicted in FIG. 1. Typically, distinct SRFF mechanisms operate on each of the intake and exhaust valves 52 and 58 of each cylinder 48. In the present implementation, each cylinder 48 includes two SRFF mechanisms.

Each SRFF mechanism provides two levels of valve lift for one of the intake and exhaust valves 52 and 58. The two levels of valve lift include a low lift and high lift and are based on the low lift cam lobes and high lift cam lobes, respectively. During "normal" operation (i.e. low lift operation or a low lift state), a low lift cam lobe causes the SRFF mechanism to pivot to a second position in accordance with the prescribed geometry of the low lift cam lobe and thereby open one of the intake and exhaust valves 52 and 58 a first predetermined amount. During high lift operation (i.e. a high lift state), a high lift cam lobe causes the SRFF mechanism to pivot to a third position in accordance with the prescribed geometry of the high lift cam lobe and thereby opening one of the intake and exhaust valves 52 and 58 to open a second predetermined amount greater than the first predetermined amount.

A position sensor 68 senses a position of the cam phaser 62 and generates a cam phaser position signal indicative of the position of the cam phaser 62. A pressure sensor 70 generates a pressure signal indicating a pressure of the fluid supply supplied to the phaser actuator 65 of the cam phaser 62. It is anticipated that one or more pressure sensors 70 can be implemented. An engine speed sensor 72 is responsive to a rotational speed of the engine 42 and generates an engine speed signal in revolutions per minute (RPM).

A control module 74 includes a processor and memory such as random access memory (RAM), read-only memory (ROM), and/or other suitable electronic storage. The control module 74 communicates with the position sensor 68, the pressure sensor 70, and the engine speed sensor 72. The control module 74 may receive input from other sensors 76 of the exemplary vehicle 40 including, but not limited to, oxygen sensors, engine coolant temperature sensors, and/or mass airflow sensors.

The control module 74 executes a diagnostic system of the present invention. The diagnostic system detects a failure state of one of the SRFF mechanisms of the engine 42 based at least on the engine speed and pressure signals transmitted from the speed sensor 72 and the pressure sensor 70, respectively. More specifically, the diagnostic system identifies one of the cylinders 48 associated with the failed SRFF mechanism, thereby enabling the control module 74 to command remedial actions (e.g. limiting engine speed) in order to prevent damage to the engine 42.

Figure 3:
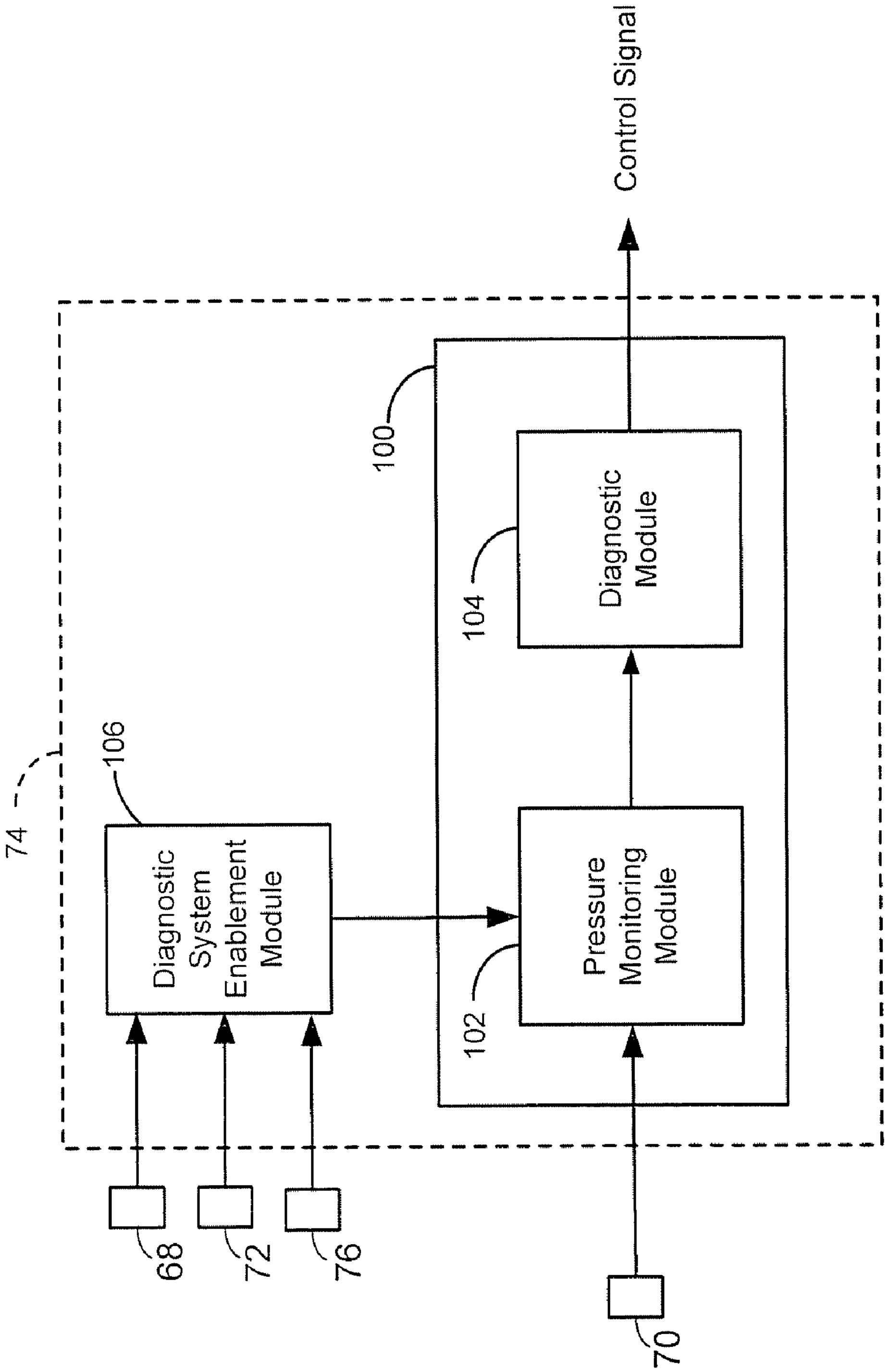
FIG. 3 is a functional block diagram illustrating an exemplary module that executes the diagnostic system of the present disclosure.

Referring now to FIG. 3, the control module 74 is shown in more detail. The control module 74 includes an exemplary diagnostic system 100 of the present invention. The diagnostic system 100 includes a pressure monitoring module 102 and a diagnostic module 104.

In the present implementation, a diagnostic system enablement module 106 communicates with the engine speed sensor 72, the position sensor 60, and other sensors 76. The diagnostic system enablement module 106 determines whether to enable to the diagnostic system 100 by verifying that various enablement conditions are met. The enablement conditions can include ensuring that the engine speed of the engine 42 falls below an engine speed threshold (e.g. 2000 RPM) and that the cam phaser 62 remains in a steady-state operating position. In other words, the diagnostic system enablement module 106 verifies that the engine 42 is operating in a "normal" or low lift state. Those skilled in the art will appreciate that various other enablement conditions are contemplated. If the enablement conditions are met, the diagnostic system enablement module 106 enables the diagnostic system 100.

The pressure monitoring module 102 communicates with the pressure sensor 70, the diagnostic system enablement module 106, and the diagnostic module 104. The pressure monitoring module 102 monitors pressure variations generated by the fluid supply at the cam phaser 62 that occur while opening each of the intake valves 52 (i.e. operation the SRFF mechanisms) of the cylinders 48. Please note that although the present implementation describes the diagnostic system with respect to the intake valves 52, those skilled in the art can appreciate that the pressure monitoring principles of the present disclosure are also applicable to the exhaust valves 58.

More specifically, the pressure monitoring module 102 determines an average low lift pressure value corresponding to each of the cylinders 48 based on input received from the pressure sensor 70. The pressure signal is based on the energy required to open each of the intake valves 52. Therefore, the pressure monitoring module 102 correlates pressure data (e.g. average low lift pressure values and average high lift pressure values) to one of the cylinders 48. In the present implementation, each average low lift pressure value is determined over a calibrated number (e.g. 8) revolutions of the engine 42.

Upon determining an average low lift pressure value corresponding to each of the cylinders 48, the diagnostic module 104 commands the engine 42 to transition to high lift operation. In other words, the diagnostic module 104 commands each of the SRFF mechanisms to pivot to the third position in accordance with the prescribed geometry of the high lift cam lobe. Those skilled in the art can appreciate that the present invention anticipates executing the diagnostic system 100 while operating the engine 42 in the high lift state and subsequently transitioning the engine 42 to the low lift state.

The pressure monitoring module 102 determines an average high lift pressure value of the fluid supply corresponding to each of the cylinders 48 after the engine 42 is transitioned to operate in the high lift state. The pressure monitoring module 102 determines each average high lift pressure value over the calibrated number of revolutions of the engine 42. In the present implementation, the pressure monitoring module 102 observes a calibrated wait period (e.g. 4 revolutions of the engine 42) to ensure the engine 42 has properly transitioned to the high lift state. The pressure monitoring module 102 then calculates a pressure difference between the average low lift pressure value and the high lift pressure value corresponding to each of the cylinders 48.

The diagnostic module 104 communicates with the pressure monitoring module 102. The diagnostic module 104 determines whether a SRFF mechanism associated with one of the cylinders 48 has failed based on the pressure differences. The diagnostic module 104 individually compares each of the pressure differences corresponding to the cylinders 48 to a pressure threshold. In the present implementation, the pressure threshold is approximately 2.5 pounds per square inch (PSI). Other pressure thresholds are anticipated. If the diagnostic module 104 determines that one of the pressure differences is below the pressure threshold, the diagnostic module 104 generates and transmits a failure control signal identifying the cylinder 48 corresponding to the pressure difference (i.e. the pressure difference falling below the pressure threshold). In other words, the diagnostic module 104 identifies a cylinder 48 associated with a SRFF mechanism that has failed to transition from the low lift state to the high lift state. The control module 74 may command remedial action to prevent damage to the engine 42 based on the failure control signal.

Figure 4:
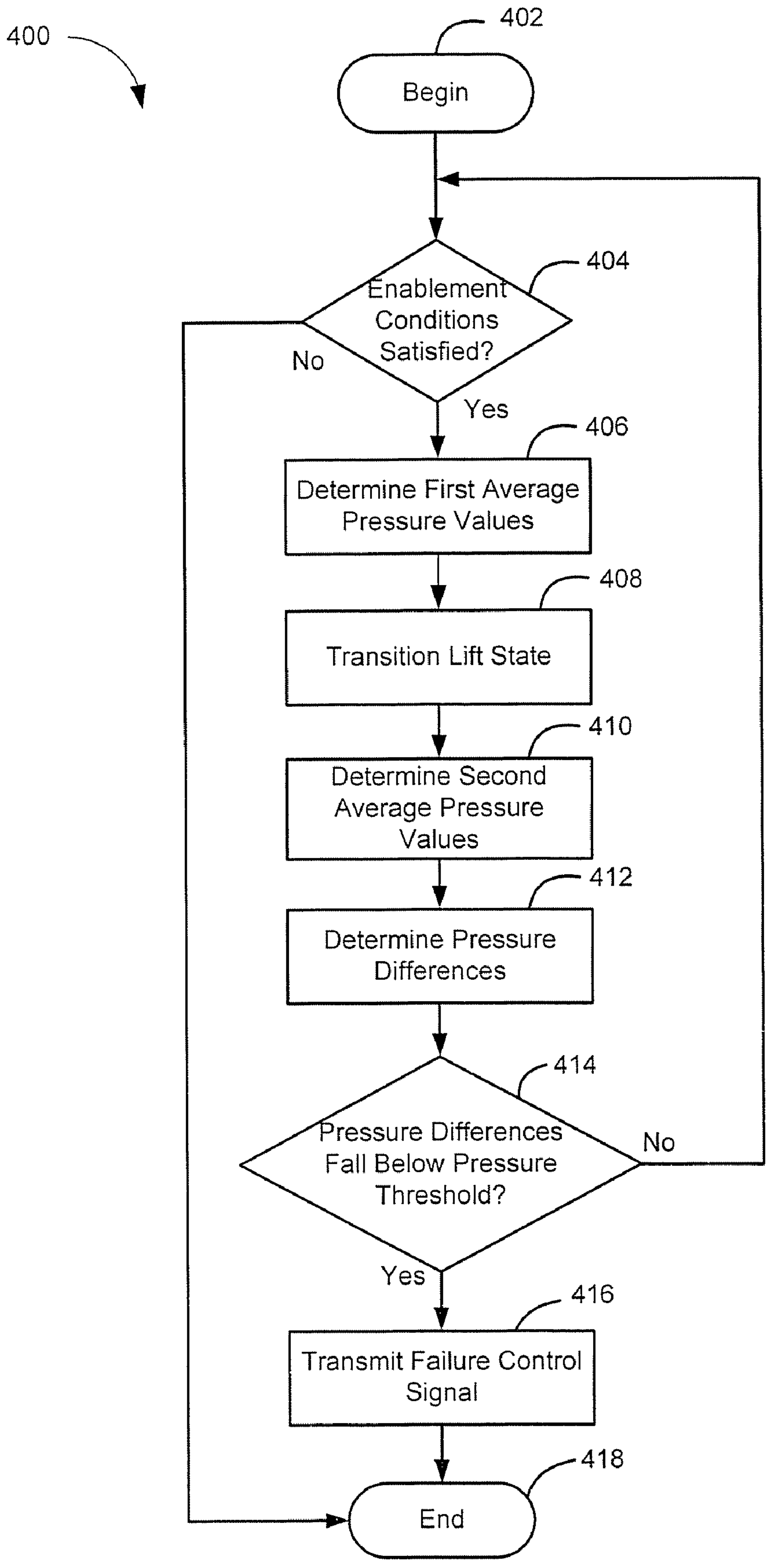
FIG. 4 is a flowchart illustrating a method of operating the diagnostic system of the present disclosure.

Referring now to FIG. 4 an exemplary method 400 for controlling the diagnostic system will be described in more detail. Control begins the method 400 in step 402. In step 404, control determines whether the enablement conditions have been satisfied. If the enablement conditions have not been satisfied, the method 400 proceeds to step 418. If the enablement conditions have been satisfied, control proceeds step 406.

In step 406, control determines first average pressure values (e.g. average low lift pressure values) corresponding to each of the cylinders 48. In step 408, control commands the engine 42 to transition from a first lift state (e.g. the low lift state) to a second lift state (e.g. the high lift state). In step 410, control determines second average pressure values (e.g. average high lift pressure values) corresponding to each of the cylinders 48. In step 412, control determines pressure differences corresponding to each of the cylinders 48.

In step 414, control determines whether at least one of the pressure differences determined in step 412 falls below the pressure threshold. If the pressure differences exceed the pressure threshold, control determines that no SRFF mechanism failure exists and returns to step 404. If at least one pressure difference exceeds the pressure threshold, control proceeds to step 416. In step 416, control transmits a failure control signal identifying at least one cylinder 48 associated with the SRFF mechanism failure.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A diagnostic system for an engine, comprising:

a pressure monitoring module that determines a plurality of first average pressure values and a plurality of second average pressure values of a fluid supply provided to a camshaft phaser; and a diagnostic module that identifies one of a plurality of cylinders associated with a failed variable valve lift mechanism based on said first and said second average pressure values;

wherein each of said first and said second average pressure values respectively correspond to each of said plurality of cylinders.

2. The system of claim 1 wherein said pressure monitoring module determines said plurality of first average pressure values when said engine is operating in a first lift state and determines said second average pressure values when said engine is operating in a second lift state.

3. The system of claim 2 wherein said diagnostic module commands said engine to transition to said second lift state after said pressure monitoring module determines said plurality of first average values.

4. The system of claim 3 wherein said pressure monitoring module determines said second average pressure values after operating in said second lift state for a calibrated number of revolutions of said engine.

5. The system of claim 1 wherein said diagnostic module identifies said one of said plurality of cylinders based on pressure differences between each of said plurality of first average pressure values and said plurality of second average pressure values.

6. The system of claim 5 wherein said diagnostic module identifies said one of said plurality of cylinders when one of said plurality of pressure differences corresponding to said one of said plurality of cylinders exceeds a pressure threshold.

7. The system of claim 1 wherein said diagnostic module generates a control signal identifying said one of said plurality of cylinders.

8. The system of claim 7 further comprising a control module that commands remedial action based on said control signal.

9. The system of claim 1 wherein said pressure monitoring module determines said first and said second average pressure values over a calibrated number of revolutions of said engine.

10. The system of claim 1 further comprising an enablement module that enables said system when at least one enablement condition is met.

11. A diagnostic method for an engine, comprising:

determining a plurality of first average pressure values and a plurality of second average pressure values of a fluid supply provided to a camshaft phaser; and identifying one of a plurality of cylinders associated with a failed variable valve lift mechanism based on said first and said second average pressure values;

wherein each of said first and said second average pressure values respectively correspond to each of said plurality of cylinders.

12. The method of claim 11 further comprising determining said plurality of first average pressure values when said engine is operating in a first lift state and determines said second average pressure values when said engine is operating in a second lift state.

13. The method of claim 12 further comprising commanding said engine to transition to said second lift state after determining said plurality of first average values.

14. The method of claim 13 further comprising determining said second average pressure values after operating in said second lift state for a calibrated number of revolutions of said engine.

15. The method of claim 11 further comprising identifying said one of said plurality of cylinders based on pressure differences between each of said plurality of first average pressure values and said plurality of second average pressure values.

16. The method of claim 15 further comprising identifying said one of said plurality of cylinders when one of said plurality of pressure differences corresponding to said one of said plurality of cylinders exceeds a pressure threshold.

17. The method of claim 11 further comprising generating a control signal identifying said one of said plurality of cylinders.

18. The method of claim 17 further comprising commanding remedial action based on said control signal.

19. The method of claim 11 further comprising determining said first and said second average pressure values over a calibrated number of revolutions of said engine.

20. The method of claim 11 further comprising enabling said method when at least one enablement condition is met.

* * * * *